(12) United States Patent
Cunningham

(10) Patent No.: US 6,494,495 B1
(45) Date of Patent: Dec. 17, 2002

(54) LOCKED CONNECTION

(75) Inventor: James A. Cunningham, St. Mary Parish, LA (US)

(73) Assignees: John D. McKnight, New Iberia, LA (US); Brent H. McKnight, Corpus Christi, TX (US)

( * ) Notice: Subject to any disclaimer, the term of this patent is extended or adjusted under 35 U.S.C. 154(b) by 0 days.

(21) Appl. No.: 09/664,423

(22) Filed: Sep. 18, 2000

(51) Int. Cl.$^7$ ................................................ F16L 21/00
(52) U.S. Cl. ............................ 285/91; 285/90; 285/92; 285/404
(58) Field of Search ............................ 285/92, 90, 91, 285/404, 82

(56) References Cited

U.S. PATENT DOCUMENTS

| | | | |
|---|---|---|---|
| 48,667 A | | 7/1865 | Esler |
| 132,755 A | | 11/1872 | Downing |
| 387,475 A | | 8/1888 | Whaling |
| 473,818 A | | 4/1892 | Binns |
| 726,336 A | * | 4/1903 | Ott ............................ 285/90 X |
| 754,741 A | | 3/1904 | Brintzinghoffer |
| 951,283 A | * | 3/1910 | Krischer ................. 285/404 X |
| 1,407,335 A | | 2/1922 | Reynolds |
| 2,680,358 A | * | 6/1954 | Zublin ........................ 285/91 X |
| 3,142,258 A | * | 7/1964 | Rutherford ................ 285/91 X |
| 3,260,319 A | * | 7/1966 | Conover ................... 285/404 X |
| 3,390,897 A | * | 7/1968 | Moore ..................... 285/404 X |
| 3,829,136 A | * | 8/1974 | Eidelberg .................... 285/404 |
| 4,067,404 A | * | 1/1978 | Crase ........................ 285/91 X |
| 4,289,339 A | * | 9/1981 | Hansen .................... 285/404 X |
| 5,160,175 A | * | 11/1992 | Yang ........................ 285/90 X |
| 5,348,349 A | | 9/1994 | Sloane |

FOREIGN PATENT DOCUMENTS

DE        4000464    *  3/1989   ............... 285/90 X

* cited by examiner

Primary Examiner—Lynne H. Browne
Assistant Examiner—David E. Bochna
(74) Attorney, Agent, or Firm—G. Turner Moller

(57) ABSTRACT

A locked connection comprises a circular groove around a pin or inside member. A box or outside member provides a series of passages tangential to the groove in a made up position of the box and pin. One or more locking pins extend through the passages. When the box and pin tend to move relative to each other, the locking pin is placed in shear in a path extending along the long dimension of the pin whereby a large shear area is provided by a small diameter locking pin.

27 Claims, 2 Drawing Sheets

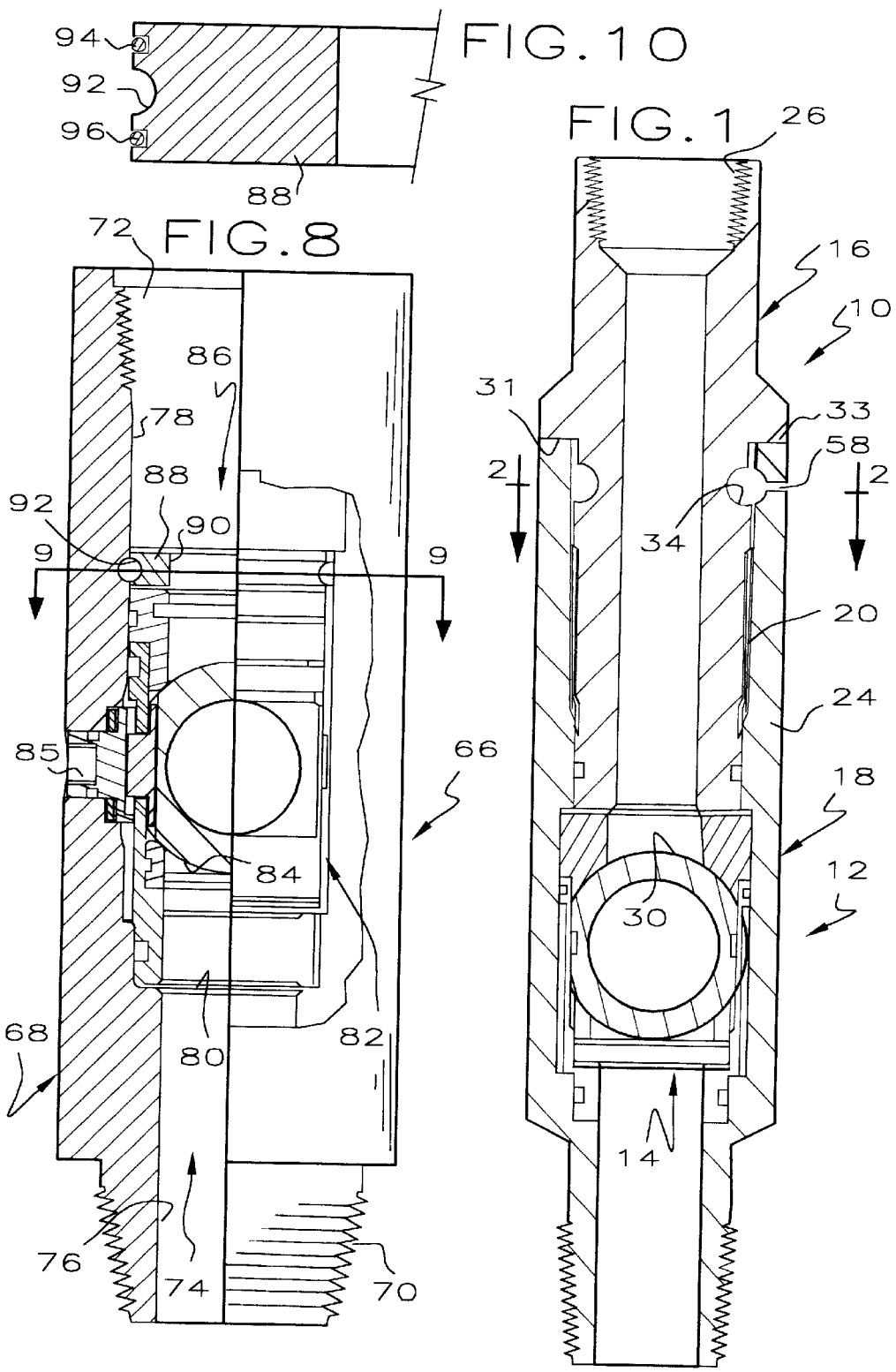

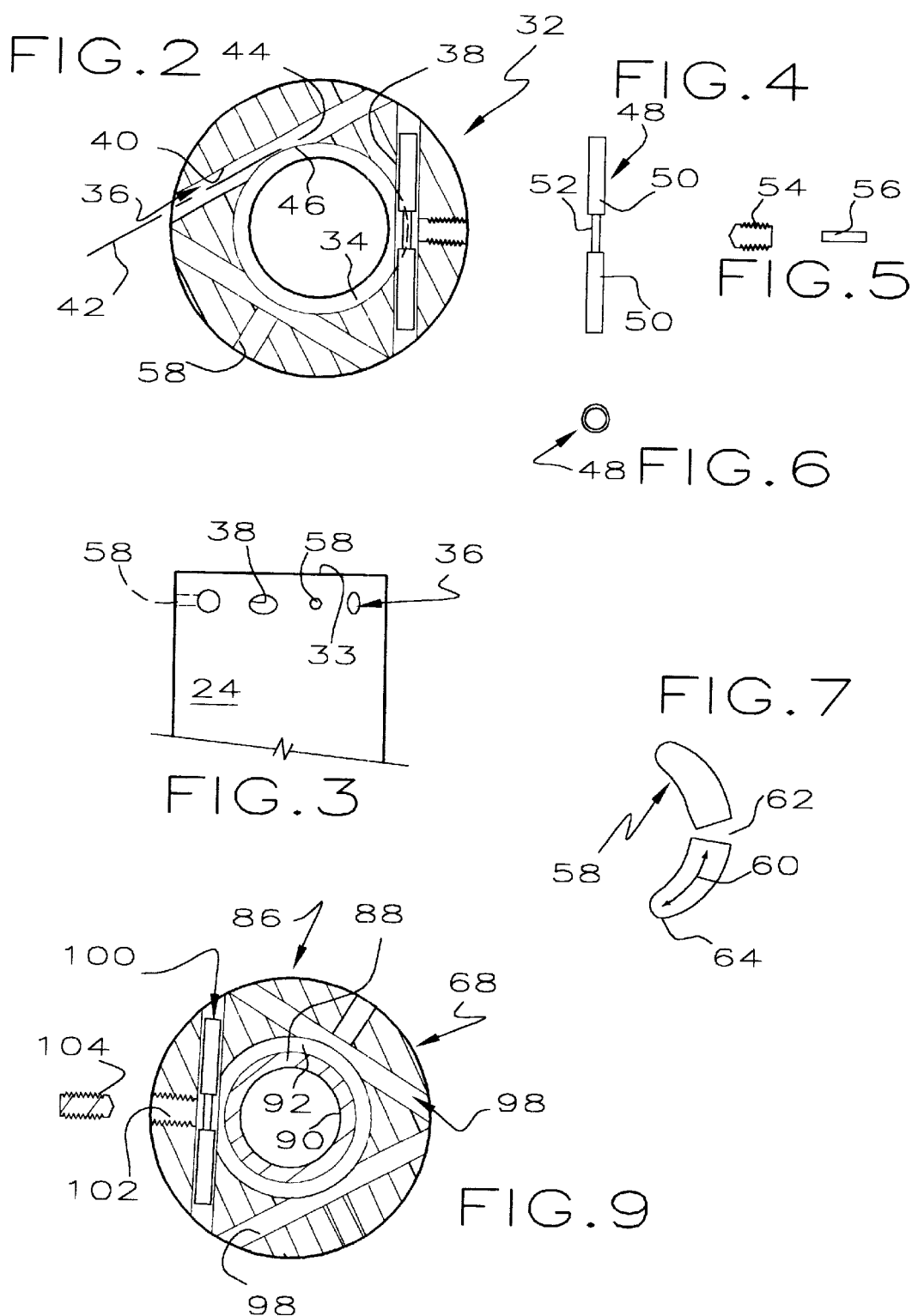

LOCKED CONNECTION

This invention relates to a connection between mechanical parts that is locked so it does not inadvertently uncouple.

BACKGROUND OF THE INVENTION

On a workover rig used to recomplete or do remedial work on oil or gas wells, a power swivel is often used to rotate a tubing string, make up or break the threaded connections between adjacent tubing joints and the like. A safety valve is typically provided immediately below the power swivel to control blow out pressure coming up the tubing string. Typical safety valves include housing sections that are threaded together, a valve mechanism inside the housing and an operator recessed into the side of the housing that can be manipulated with a suitable tool. Because the power swivel provides the torque to make up and break the threaded connections between tubing joints, the safety valve must transmit both clockwise and counterclockwise torque. Safety valves are typically made so that the clockwise torque, viewed from above, used to tighten tubing joints also tightens the threaded housing sections of the safety valve. This means that counterclockwise torque, used to break the tubing joints, also tends to unthread the safety valve housing. Thus, a torque which unscrews the housing is applied periodically to the safety valve and safety valve housings are occasionally unintentionally uncoupled.

The prior art solution to this problem has been to provide one or more set screws extending through one of the housing sections into the other. When it is desired to uncouple the housing sections to replace the valve seats, for example, the set screws are removed and the housing sections unthreaded. One often finds the set screws are cracked or broken, the housing adjacent the set screw passages are cracked or the threads of the set screw passages to are deformed making it extremely difficult to remove the set screws. This often requires redrilling a new series of set screw passages or replacing the housing. Breaking of the set screws, cracking of the housing or deformation of the set screw passages is clear evidence of the forces applied to the housing by the power swivel.

Disclosures of some interest relative to this invention are found in U.S. Pat. Nos. 48,667; 132,755; 387,475; 473,818; 754,741; 1,407,335 and 5,348,349.

SUMMARY OF THE INVENTION

In this invention, a locked connection between mechanical parts is provided to prevent inadvertent uncoupling movement between the parts. This is accomplished by providing an outwardly facing circular groove on an interior part and one or more passages on an exterior part tangentially intersecting the groove. The passage accordingly provides an intermediate open section aligned with the circular groove in a connected position of the mechanical parts. The intermediate passage section and the groove cooperate to provide a passageway of a preferred cross-section, usually circular.

A locking pin extends through the passage and groove preventing uncoupling movement of the mechanical parts. Suitable means, such as a set screw or shear pin, prevents axial movement of the locking pin out of the passage. In this manner, the large force tending to uncouple the mechanical parts is taken by the locking pin. The set screw or shear pin has to resist a much smaller force tending to move the locking pin out of the passage.

When uncoupling forces are applied to the connection, part of the locking pin is placed in shear, specifically a path corresponding to the intersection of the circular groove and the locking pin. The long dimension of this intersection is curved because the groove is curved. The maximum short dimension of this intersection is the cross-section of the locking pin. With this geometry, the available area of the locking pin that is in shear is much larger than the diameter of the locking pin, usually by a factor of at least two and one half, preferably of at least three and ideally at least four.

In one embodiment of this invention, the locked connection prevents unthreading movement of a threaded connection, such as in a tubing safety valve. In another embodiment of this invention, the locked connection prevents axial uncoupling movement of adjacent unthreaded components, such as an abutment used to position a valve cartridge in an operative position. A substantial advantage of this invention is that the passages in the box end are always aligned with the groove in the pin end in the made up position of the threaded components. This is in contrast to a situation where the passage in the pin end extends through the body of the pin end so the pin passage-and box passage must be rotationally aligned.

It is an object of this invention to provide an improved locked connection between adjacent mechanical parts which are capable of uncoupling movement.

Another object of this invention is to provide an improved locked connection between mechanical parts which are threaded together.

A further object of this invention to provide an improved locked connection between valve housing sections.

Another object of this invention is to provide an improved locked connection in which the main loads are taken by a locking pin in which the geometry of the assembly provides a large area in shear.

A further object of this invention is to provide an improved locked connection in which a long dimension of a locking pin is placed in shear.

These and other objects and advantages of this invention will become more fully apparent as this description proceeds, reference being made to the accompanying drawings and appended claims.

BRIEF DESCRIPTION OF THE DRAWINGS

FIG. 1 is a longitudinal cross-sectional view of a tubing safety valve of this invention;

FIG. 2 is a transverse cross-sectional view of the valve of FIG. 1, taken substantially along line 2—2 thereof as viewed in the direction indicated by the arrows;

FIG. 3 is a side view of the end of the box connection of FIGS. 1 and 2, showing the passages which receive a locking pin;

FIG. 4 is a side view of a locking pin used with this invention;

FIG. 5 is an end view of a locking pin used in this invention;

FIG. 6 is a view of a set screw and a shear pin used to fix the position of the locking pin;

FIG. 7 is a pictorial view of the area of the locking pin that is placed in shear;

FIG. 8 is a broken view of a kelly valve incorporating this invention;

FIG. 9 is a transverse cross-sectional view of the valve of FIG. 8, taken substantially along line 9—9 thereof as viewed in the direction indicated-by the arrows; and FIG. 10 is an enlarged view of part of the connection of FIGS. 8 and 9.

DETAILED DESCRIPTION

Referring to FIGS. 1–6, a tubing safety valve 10 includes a housing 12 receiving a valve cartridge 14. The housing 12 includes an upper or inlet end 16 and a lower or outlet end 18 connected together by threads 20. It will be seen that the upper housing half 16 provides a pin end 22 in the position of a mandrel and extends into the lower housing half 18 which provides a box end 24 in the position of a sleeve. The upper housing half 16 includes a threaded box connection 26 for connection to a power swivel (not shown) or the like. The lower housing half 18 includes a threaded pin connection 28 for connection to tubing (not shown) or the like.

The valve cartridge 14 may be of any suitable type, such as shown in U.S. Pat. 5,246,203 to which reference is made for a more complete description of the valve cartridge 14 and its operating components. The valve cartridge 14 provides a valve ball 30 movable between flow allowing and flow preventing positions. An operator (not shown) is exposed through a passage (not shown) in the housing 12 so a suitable tool (not shown) may be used to manipulate the valve ball 30 between its open and closed positions. As heretofore described, the tubing safety valve 10 is conventional.

Threaded connections, such as in the safety valve 10, used in hydrocarbon wells are normally tightened by right handed or clockwise torque, i.e. as viewed from above and unthreaded by left handed or counterclockwise torque. Because the safety valve 10 must transmit torque in both clockwise and counterclockwise directions, there is a tendency of the housing halves 16, 18 to unthread when breaking connections of a tubing string (not shown) being run into or out of a hydrocarbon well (not shown). To prevent uncoupling movement, one or more locking assemblies 32 are provided.

In one sense, there are two types of threaded connections. One type, exemplified by what are known as eight round threads used to connect tubing joints, do not have shoulders that abut in a made up condition of the threaded connection. One feature of an unshouldered connection of this type is that the axial position of the coupled parts depends on how much torque is applied to the parts, i.e. they thread together until the frictional forces between the threads exceeds the torque applied. A second type threaded connection, exemplified by drill pipe connections, provides shoulders on the coupled parts so that axial movement between the threaded parts is limited by the shoulders. When using this invention with threaded connections, it is preferred to use the second type connection, i.e. a connection having some means to limit axial movement between the coupled parts, as will be more fully apparent hereinafter. Thus, the housing halves 16, 18 provide shoulders 31, 33 limiting axial movement between the housing halves as a consequence of threading movement.

The locking assemblies 32 each comprise a groove 34 on the pin end 22 of the upper housing half 16 and one or more tangential passages 36 extending through the box end 24 of the lower housing half 18. The tangential passages 36 intersect the groove 34 in an assembled position of the housing halves 16, 18 so the passages 36 each include sections 38, 40 which extend through the outer housing half 18 and provide a centerline or axis 42. An intermediate section 44 of the passage 36 opens radially inwardly so the passage 36 intersects the groove 34 as shown in FIG. 2. FIG. 2 also shows that the passage 36 intersects the groove 34 along a circular path 46. At least two and preferably three passages 36 are provided to provide multiple locking pins which provide increased shear area and thus increased resistance to uncoupling movement.

The assemblies 32 also include one or more locking pins 48 which are preferably straight solid members having enlarged outer sections 50 and an intermediate section 52 of reduced diameter. A set screw 54 or shear pin 56 is inserted through a small passage 58 into the intermediate section 52. In this manner, the large forces Lo caused by uncoupling movement of the housing halves 16, 18 are resisted by the locking pin 48 while the smaller forces tending to move the locking pin 48 out of the passage 36 are resisted by the set screws 54 or the shear pins 56.

An important feature of the locked connection is the large area in shear provided by the geometry of the assemblies 32. When the housing halves 16, 18 move in an unthreading direction, the locking pin is placed in shear. The area 58 in shear is of peculiar shape and is shown pictorially in FIG. 7. The long dimension 60 is an arcuate segment corresponding to the intersection between the groove 34 and the passage 36. The long dimension 60 is, of course, interrupted by an area 62 corresponding to the intermediate section 52 of the locking pin, i.e. the section 52 is not in shear. The maximum extent of the short dimension is the thickness of the locking pin 48. The ends 64 of the shear area 60 are curved because of the groove 34 is curved relative to the passage 36.

The ability of any set screw or locking pin to resist uncoupling movement is a function of the area placed in shear. In this invention, the dimensions of this area may be visualized by a comparison of FIGS. 2 and 7. The long dimension 60 of the shear area 58 approaches the length of the enlarged outer sections 50 of the locking pin and is typically in the range of 70–95% of the length of the enlarged outer sections, depending on the curvature of the groove 34 and the length of the pin 48 which extends beyond the end of the groove 34. The shear area 58 accordingly defines an arcuate surface extending from adjacent the center of the shear pin 48 to axially spaced locations on the same side of the shear pin, i.e. facing toward the inside diameter of the groove 34.

The short dimension of the shear area 58 varies a great deal from a maximum adjacent the area 62 to a minimum at the ends of the shear area. This area can be determined when the diameter of the groove 34, the diameter of the locking pin and the like are known.

An important feature of the locked connection is the total area of the locking pin in shear is much larger than the cross-sectional area of the pin. The available area of the locking pin that is in shear is much larger than the diameter of the locking pin, usually by a factor of at least two and one half, preferably of at least three and ideally at least four. The size of the shear area is best understood by reference to a prototype of the invention in which a passage having a 2.11" radius was provided with a groove 34. The passages 38 intersected the groove through an angular distance of 56.35° and the shear pins 48 were ½" diameter. The maximum short dimension of the shear area was accordingly ½". The maximum long dimension can be calculated as 56.35/360× the inside circumference=56.35/360×3.1416×4.22=2.075". A graphical determination of the shear area, disregarding the area 62, shows it is on the order of about 75% of a rectangle having a short side of ½" and a long side of 2.075", so the shear area is about ½"×2.075"×0.75=0.778 square inches. The cross-sectional area of the shear pin is 0.19635 square inches. The ratio of the shear area of this invention to the cross-sectional area of the pin 48 is accordingly about 3.96.

Another way of looking at the relationship between the shear area and the shear pin 48 is that the shear area lies in an arc having a smaller curvature than the curvature of the shear pin 48. In the embodiment of FIG. 2, the arc of the shear area corresponds to the circumference of the groove 34. If the shear pin 48 is straight, its arc of curvature is infinite, so the radius of curvature of the shear area is manifestly shorter. Similarly, if the shear pin 48 is curved, it will necessarily be of a larger curvature than the arc of the shear area.

Referring to FIGS. 8 and 9, a conventional kelly valve 66 comprises a one piece housing or valve body 68 having a threaded drill pipe pin 70 at the lower end and a threaded drill pipe box 72 at the upper end. The valve body 68 provides an axial passage 74 therethrough including a relatively small lower passage section 76, a relatively large upper passage section 78 and a shoulder 80 on which sits a valve cartridge 82 including a valve ball 84 and actuator 85. As heretofore described, the valve 66 as disclosed and described in U.S. Pat. No. 5,246,203, the disclosure of which is incorporated herein by reference.

The valve cartridge 82 is held in place by a connection 86 of this invention. The connection comprises a circular plate or mandrel 88 having a passage 90 therethrough corresponding to the flow passage of the valve 66. A semi-circular groove 92 is provided on the circumference of the plate 88 between a pair of O-rings 94, 96. The valve body 68, comprising a sleeve around the mandrel, is bored with at least one passage 98 tangential to the groove 92 as shown best in FIG. 9. A shear pin 100, similar to the shear pin 48 is provided for each of the passages 98. An intersecting passage 102 for each of the passages 98 allows placement of a shear pin or set screw 104 to prevent axial movement of the shear pin 100.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A locked threaded coupling comprising
    a threaded box and a threaded pin providing a flow path extending in an axial direction therethrough and having shoulders abutting in a made-up position of the box and pin and providing a limit of threading movement;
    the threaded pin having a radially outwardly opening arcuate groove spaced from the threads;
    the box having at least one passage tangential to the groove in the made-up position of the threads providing a first outer section on a first side of the box, an intermediate section intersecting the groove and a second outer section on a side of the box adjacent to the first side of the box; and
    a locking pin extending through the first and second outer sections of the passage and through the intermediate section for preventing relative axial movement of the box and threaded pin;
    the groove and the passage being of the same length in the axial direction and closely receiving the locking pin;
    the groove, the passage and the locking pin preventing relative axial movement of the box and threaded pin in a multiplicity of rotational positions of the threaded pin relative to the box.

2. The coupling of claim 1 wherein the intermediate section of the passage and the groove cooperate to provide a passageway of predetermined cross-section, the groove extending at least half way around the threaded pin.

3. The coupling of claim 2 wherein the predetermined cross-section is circular.

4. The coupling of claim 2 wherein about half of the passageway is provided by the groove and about half is provided by the passage.

5. The coupling of claim 2 wherein the outer sections of the passage are generally circular.

6. The coupling of claim 1 further comprising means preventing movement of the locking pin out of the passage.

7. The coupling of claim 6 wherein the preventing means comprises an element extending transversely of the locking pin into engagement with the locking pin and preventing movement of the locking pin out of the passage.

8. The coupling of claim 7 wherein the preventing means comprises a set screw.

9. The coupling of claim 7 wherein the preventing means comprises a shear pin.

10. The coupling of claim 7 wherein the locking pin comprises end sections received in the outer sections of the passage and a central section in the groove, the central section including a segment of smaller cross sectional area than the end sections, the element extending into the smaller cross sectional area.

11. The coupling of claim 1 providing at least two passage receiving locking pins therein.

12. The coupling of claim 1 wherein unthreading movement of the box and threaded pin places the locking pin in shear along a path corresponding to the intersection of the groove and passage.

13. The coupling of claim 12 wherein the locking pin is of circular cross-section.

14. The coupling of claim 1 wherein the locking pin is wholly received within the passage.

15. The coupling of claim 1 wherein the passage is straight.

16. The coupling of claim 1 wherein the groove is intermediate the ends of the locking pin.

17. A connection comprising
    a threaded inner member including a mandrel providing a radially outwardly facing concave groove extending around the mandrel at a location spaced from threads;
    a threaded outer member including a sleeve having an axial passage therein receiving the mandrel in a made-up position of the connection and having a transverse passage therein tangential to the groove in the made-up position of the mandrel and sleeve, the passage providing
    a radially closed first outer section on one side of the sleeve,
    an intermediate section intersecting the groove and radially open toward the groove and a radially closed second outer section on an opposite side of the sleeve;
    the groove and the passage being of the same axial extent; and
    a locking pin extending through the first and second outer sections and through the intermediate section and preventing axial movement between the mandrel and sleeve in a multiplicity of rotational positions of the inner member relative to the outer member.

18. The connection of claim 17 further comprising means preventing movement of the locking pin out of the passage.

19. The coupling of claim 17 wherein unthreading movement of the mandrel and sleeve places the locking pin in shear along a path along the intersection of the groove and the passage.

20. The coupling of claim 17 wherein the mandrel and sleeve provide abutting shoulders in the made-up position.

21. The coupling of claim 17 further comprising a threaded connection having a threaded box providing the sleeve and a threaded pin providing the mandrel, the groove being axially spaced from threads.

22. The coupling of claim 17 wherein the mandrel is of circular cross-section.

23. The connection of claim 17 wherein unthreading movement of the sleeve and mandrel places the locking pin in shear through an area at least 2.5 times the cross-section of the locking pin.

24. The connection of claim 23 wherein the sections of the locking pin in shear being, in area, at least three times the cross-section of the locking pin.

25. The connection of claim 23 wherein unthreading movement of the sleeve and mandrel places a section of the locking pin in shear, the section in shear extending along the long dimension of the locking pin.

26. The connection of claim 25 wherein the section in shear is curvilinear.

27. The connection of claim 26 wherein the section in shear has a curvilinear long dimension, the locking pin being circular in cross-section providing a diameter, the diameter being a maximum short dimension of the section in shear.

\* \* \* \* \*